United States Patent [19]
Akiyama et al.

[11] Patent Number: 4,692,507
[45] Date of Patent: Sep. 8, 1987

[54] PROPYLENE-BASE RANDOM COPOLYMER PARTICLES AND PRODUCTION PROCESS THEREOF

[75] Inventors: Hiroyuki Akiyama, Hiratsuka; Susumu Izawa, Utsunomiya; Hideki Kuwabara, Hadano, all of Japan

[73] Assignee: Japan Styrene Paper Corporation, Tokyo, Japan

[21] Appl. No.: 852,574

[22] Filed: Apr. 16, 1986

Related U.S. Application Data

[62] Division of Ser. No. 795,431, Nov. 6, 1985, Pat. No. 4,602,082.

[30] Foreign Application Priority Data

Mar. 20, 1985 [JP]  Japan .................................. 60-57454

[51] Int. Cl.$^4$ ............................................... C08F 6/00
[52] U.S. Cl. ...................................... 528/481; 521/56; 521/58; 521/60; 521/143; 521/144
[58] Field of Search .................... 528/481; 521/56, 58, 521/60

[56]  References Cited
U.S. PATENT DOCUMENTS

| | | | |
|---|---|---|---|
| 4,303,756 | 12/1981 | Kajimura et al. | 521/60 |
| 4,303,757 | 12/1981 | Kajimura et al. | 521/60 |
| 4,379,859 | 4/1983 | Hirosawa et al. | 521/60 |
| 4,399,087 | 8/1983 | Akiyama et al. | 521/60 |
| 4,415,680 | 11/1983 | Ushirokawa et al. | 521/60 |
| 4,429,059 | 1/1984 | Ozutzumi et al. | 521/60 |
| 4,436,840 | 3/1984 | Akiyama et al. | 521/60 |
| 4,448,901 | 5/1984 | Senda et al. | 521/60 |
| 4,464,484 | 8/1984 | Yoshimura et al. | 521/60 |
| 4,504,534 | 3/1985 | Adachi et al. | 521/60 |
| 4,567,208 | 1/1986 | Kuwabara et al. | 521/59 |
| 4,587,270 | 5/1986 | Kuwabara et al. | 521/58 |
| 4,617,323 | 12/1986 | Kuwabara et al. | 521/60 |

*Primary Examiner*—Morton Foelak
*Attorney, Agent, or Firm*—Sherman and Shalloway

[57]  ABSTRACT

Propylene-base random copolymer particles suitable for use in the production of pre-foamed particles are obtained by heating starting copolymer particles of ethylene-propylene random copolymer to the crystallization temperature thereof and then quenching them in a medium at a temperature of (the crystallization temperature-30° C.) or lower. Pre-foamed particles produced using the copolymer particles contain large cells are columnar in shape with an average diameter D of 1.7 mm or less and an L/D ≧ 1. They can thus provide foamed moldings which are substantially free of shrinkage and have good flexibility.

5 Claims, No Drawings

PROPYLENE-BASE RANDOM COPOLYMER PARTICLES AND PRODUCTION PROCESS THEREOF

This is a division of application Ser. No. 793,431, filed Nov. 6, 1985, now U.S. Pat. No. 4,602,082.

This invention relates to propylene-base random copolymer particles suitable for use in the production of pre-foamed particles thereof.

Foamed moldings (which may hereinafter be referred to as "molded articles") made of polystyrene or polyethylene as their base resin have conventionally been manufactured by beads expansion molding processes.

The present applicant paid special attention to the characteristic properties of propylene-base resins and established a series of beads expansion molding processes for such resins. Some patent applications have already been made on the production of foamed moldings of propylene-base resins. For example, with respect to foamed moldings making use of an ethylene-propylene copolymer as a base resin, reference may be made to Japanese Patent Publication No. 43492/1984 which discloses a basic beads expansion molding process.

The process disclosed in the above publication has a merit that it can provide good moldings or molded articles and is thus an excellent beads expansion molding process from the industrial viewpoint.

Incidentally, there are a variety of properties required for foamed moldings, among which dimensional stability and flexibility are both important properties. The term "dimensional stability" pertains to the shrinkage of each molded article upon its molding work, while the term "flexibility" deals with the physical strength of each molded article against bending loads, in other words, the nerve of each molded article.

No significant investigations have heretofore been made on the production of foamed moldings or molded articles equipped with both good dimensional stability and good flexibility. There were some conventional products, the dimensional stability and flexibility of which have been improved to certain extents. Such conventional products were however still unsatisfactory.

The present inventors carried out an extensive research with a view toward providing a solution to the above-mentioned problems. As a result, they found empirically the fact that molded articles having poor dimensional stability and flexibility will result when pre-foamed particles having smaller cell diameters are used for expansion molding work. Accordingly, they proceeded with a further research to determine which parameters of production steps govern the sizes of cell diameters. As a result, it was found that the sizes of cell diameters are closely correlated to the heat history of un-foamed particles in the course of their production. In accordance with an experiment which the present inventor conducted, it was found that cell diameters become greater when the temperature gradient ranging from the heating and softening or the melting of a resin to the formation of particles upon production of un-foamed particles is great.

An object of this invention is, on the basis of the above findings, to provide propylene-base random copolymer particles suitable for use in the production of pre-foamed particles which permit production of molded articles having excellent dimensional stability and flexibility as well as a production process of such propylene-base random copolymer particles.

As a result of a still further extensive investigation, the present inventors have finally found that propylene-base random copolymer particles, which have been obtained by heating an ethylene-propylene random copolymer resin to its crystallization temperature or higher and then quenching it in a medium at a temperature of (the crystallization temperature—30° C.) or lower upon production of starting propylene-base random copolymer particles, can produce pre-foamed particles having large cell diameters and can hence provide molded articles having excellent dimensional stability and flexibility, leading to completion of this invention.

In one aspect of this invention, there is thus provided propylene-base random copolymer particles suitable for use in the production of pre-foamed particles, which are characterized in that they are ethylene-propylene random copolymer columnar particles which have been heated to the crystallization temperature thereof or higher and then quenched in a medium at a temperature of (the crystallization temperature—30° C.) or lower.

The propylene-base random copolymer particles suitable for use in the production of pre-foamed particles are prepared by a process which includes the following steps:

heating and melting or ethylene-propylene random copolymer resin in an extruder;

extruding the resultant melt through orifices of an extruder;

quenching the resultant extrudates with a cooling medium at a temperature of (the crystallization temperature of propylene-base random copolymer resin—30° C.) or lower; and chopping the thus-quenched extrudates into particles.

The above aspects of this invention will hereinafter be described specifically.

Although propylene-base random copolymers useful in the practice of this invention include copolymers such as 1-butene-propylene random copolymers, etc. it is, however, preferred to use ethylene-propylene random copolymers singly.

Ethylene-propylene random copolymers containing the ethylene component in amounts of 0.5-10 wt.% are preferred. If the content of the ethylene component should be smaller than 0.5 wt.%, it will be difficult to pre-foam the resultant particles and hence to obtain pre-foamed particles having uniform cells and a high percentage of closed cells. On the other hand, any contents of the ethylene component in excess of 10 wt.% will result in foamed moldings or molded articles having insufficient stiffness.

According to the above described production process, a propylene-base random copolymer is charged in an extruder, in which the copolymer is heated and melted.

The copolymer charged in the extruder may be in the form of pellets or powder or may be that ground by a grinder.

After extruding the melted copolymer through extrusion orifices of the extruder into strands, the strands are brought into a cooling medium at a temperature of (the crystallization temperature—30° C.) or lower in order to quench them. Here, the average diameter of the strands of the melted copolymer extruded in the form of strands through the extrusion orifices may preferably be 1.7 mm or less. If the average diameter of the strands should exceed 1.7 mm, it will be difficult to quench the strands. The individual strands are then chopped by a cutter into particles, thereby obtaining copolymer particles. Here, it is preferred to effect the chopping of the strands in such a way that the average volume of the resulting copolymer particles falls within the range of 0.03–4 mm$^3$/particle and their average length L and average diameter D satisfy L/D≦1. If L/D<1, there may be encountered a problem that the effects of the quenching treatment may not be fully brought about.

The thus-chopped copolymer particles may generally take about 1 minute or so until they are immersed in the cooling medium. It is however preferred to quench them to a temperature of (the crystallization temperature—30° C.) or below as quickly as possible.

The above-described production process is suitable as a production process for obtaining columnar particles which have an average diameter of 1.7 mm or thinner and satisfy the relation, L/D≧1.

It is also feasible to extrude a melted copolymer through extrusion orifices of an extruder directly into a cooling medium at a temperature of (the crystallization temperature of the copolymer—30° C.) or lower and after chopping the extrudates by a cutter provided adjacent to the outlets of the extrusion orifices of the extruder, to quench the thus-chopped extrudates in the cooling medium.

As the above-described cooling medium, it is feasible to use water, ethylene glycol, methanol or the like with water being most preferred.

In the above-described production process, the measurements of the crystallization temperature and melting temperature of the respective copolymer particles are effected by differential scanning calorimetory (DSC). According to this measurement method, about 7 mg of each sample is heated from room temperature to 220° C. at a heating rate of 10° C./min with a differential scanning calorimeter and is then lowered at a rate of 10° C./min. from 220° C. to 50° C. A temperature corresponding to a peak which is obtained in the course of the temperature decrease is recorded as the crystallization temperature of the sample. The temperature corresponding to the peak of an endothermic curve, which is obtained when the sample is thereafter again heated at a rate of 10° C./min, is recorded as the melting point of the sample. Where two or more peaks are obtained, the temperatures corresponding respectively to such peaks are averaged.

The average volume of copolymer particles obtained is preferably 0.03–4 mm$^3$/particle. If the average volume should be smaller than 0.03 m$^3$/particle, it will be difficult from such copolymer particles to obtain pre-foamed particles having a high expansion ratio and containing closed cells in a high proportion.

If the average volume should exceed 4 mm$^3$/particle on the other hand, more and greater voids will be observed in a molded article produced from pre-foamed particles which have in turn been obtained from such copolymer particles. It is thus impossible to make molded articles having complex configurations or small wall thicknesses from such copolymer particles.

In addition, the preferable melt flow rate of resulting copolymer particles may range from 0.5 g/10 min. to 30 g/10 min. If this value should be lower than 0.5 g/10 min., it will be difficult to subject the copolymer particles to pre-foaming. On the other hand, any values greater than 30 g/10 min. will eventually result in foamed moldings having insufficient strengths.

The above-described copolymer particles can be used effectively for the production of pre-foamed particles. The production of such pre-foamed particles may be carried out, for example, by charging the copolymer particles, a volatile blowing agent and a dispersing medium in a closed vessel, heating with stirring the contents to a temperature above the softening point of the copolymer particles, releasing one end of the vessel while maintaining the internal pressure of the vessel at a pressure above or lower than the vapor pressure of the volatile blowing agent, and then releasing the copolymer particles and dispersing medium simultaneously out of the vessel into an atmosphere of a low pressure. The thus-obtained pre-foamed particles contain large-diametered cells (i.e., fewer cells) and have good moldability.

It is also possible to obtain foamed moldings by using pre-foamed particles obtained in the above-described manner. Such foamed moldings have excellent properties such as small shrinkage upon their molding work and large flexibility (nerve).

The present invention will hereinafter be described in further detail by the following Examples and Comparative Examples.

Pellets of an ethylene-propylene random copolymer were charged in an extruder, where they were heated and melted at 165° C. Thereafter, the melted copolymer was extruded through extrusion orifices of the extruder into strands with the corresponding average diameter shown in Table 1. After causing the strands to pass through a water bath of the corresponding temperature given in Table 1 to lower the temperature of the strands to the corresponding temperature shown in Table 1, the strands were chopped by a cutter to achieve the corresponding average volume given in Table 1.

Examples 3–4 & Comparative Examples 3–4

Pellets of an ethylene-propylene random copolymer were charged in an extruder, where they were heated and melted at 165° C. Thereafter, the melted copolymer was extruded through extrusion orifices of the extruder into a water bath of the corresponding temperature given in Table 1 and at the same time, the resultant extrudates were chopped by a cutter, which was provided in adjacent to the outlets of the extrusion orifices, to achieve the corresponding average volume shown in Table 1.

Using the copolymer particles obtained in each of the Examples and Comparative Examples, pre-foaming was conducted in the following manner. First of all, 100 kg of the copolymer particles, 220 kg of water, 300 g of fine particulate aluminum oxide and 17 kg of dichlorodifluoromethane were charged in a 400-liter autoclave. The contents were then heated to 145° C., at which they were held for 30 minutes. The autoclave was thereafter opened at one end thereof while maintaining the internal pressure of the autoclave at 30 kg/cm$^2$(G) with nitrogen gas, so that the copolymer particles and water were simultaneously released into the atmosphere to obtain pre-foamed particles. The expansion ratio and the number of cells per mm$^2$ cross-section of the thus-obtained pre-foamed particles are given in Table 1.

After applying an internal pressure of about 1 kg/cm$^2$(G) to the pre-foamed particles with air, they were charged in a molding and then heated with steam of 3.2 kg/cm$^2$(G) to cause them to expand, thereby obtaining a foamed molding of a shape conforming with the molding. The shrinkage, flexibility and voids of the thus-obtained foamed molding were measured. Results are also given in Table 1.

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Extrusion temp. (°C.) | 165 | 165 | 165 | 165 | 165 | 165 | 165 | 165 |
| Average volume (mm$^3$/particle) | 3.9 | 2 | 4 | 2 | 3.9 | 6 | 4 | 6 |
| Average diameter (mm/particle) | 1.7 | 1.1 | * | * | 1.7 | 1.8 | * | * |
| L/D | 1 | 1.9 | * | * | 1 | 1.3 | * | * |
| Temp. of cooling medium (°C.) | 25 | 25 | 25 | 25 | 75 | 75 | 75 | 75 |
| Temp. of copolymer particles right after their quenching (4) (°C.) | 50 | 35 | 50 | 35 | 80 | 80 | 80 | 80 |
| Pre-foamed particles | | | | | | | | |
| Expansion ratio (times) | 35 | 30 | 35 | 29 | 41 | 42 | 42 | 42 |
| No. of cells (cells/mm$^2$) | 15 | 10 | 20 | 10 | 320 | 350 | 350 | 350 |
| Shrinkage of molded article (1) |  |  |  |  | X | X | X | X |
| Flexibility of molded article (2) |  |  |  |  | Δ | X | X | X |
| Voids in molded article (3) |  |  |  |  |  | X |  | X |

In Table 1, the shrinkages, flexibilities, voids and temperatures of copolymer particles right after their quenching were determined respectively in the following manner.

(1) Each shrinkage is represented in accordance with the following standard, based on the shrinkage of the corresponding foamed molding along a surface thereof relative to the mold.

| Less than 2% | |
| --- | --- |
| Above 2% but less than 3% | Δ |
| Greater than 3% | X |

(2) Each flexibility was determined by NDS Z 0503 and is represented in accordance with the following standard:

| No crack | |
| --- | --- |
| Slightly cracked | Δ |
| Cracked | X |

(3) The number of voids in each molded article was determined by counting the number of voids having diameters of an average diameter of 2 mm and greater and contained in an area of 100×100 mm on a cross-section formed by slicing the molded article at a depth of 10 mm along a surface thereof, and is represented in accordance with the following standard:

| Less than 25 voids | |
| --- | --- |
| 25 voids or more | X |

(4) The temperature of each sample of copolymer particles right after its cooling was measured by filling the copolymer particles in a container of about 1 liter and then inserting a thermometer in the container.

As has been described above, pre-foamed particles produced using copolymer particles of this invention have large cells. They can thus provide foamed moldings which are substantially free of shrinkage and have good flexibility.

Having now fully described the invention, it will be apparent to one of ordinary skill in the art that many changes and modifications can be made thereto without departing from the spirit or scope of the invention set forth herein.

We claim:

1. Propylene-base random copolymer particles suitable for use in the production of pre-foamed particles, characterized in that said copolymer particles have been heated to the crystallization temperature thereof or higher and then quenched in an atmosphere of temperature of (the crystallization temperature—30° C.) or lower and are columnar particles made of an ethylene-propylene random copolymer resin and having an average diameter D of 1.7 mm or less and an average length L which has the following relation with the average diameter D:

$$L/D \geq 1.$$

2. Propylene-base random copolymer particles according to claim 1, wherein the average volume of the copolymer particles is 0.03–4 mm$^3$/particle.

3. Propylene-base random copolymer particles according to claim 1, wherein the polymer particles are ethylene-propylene random copolymer particles in which the ethylene component amounts to 0.5–10 wt.%.

4. Propylene-base random copolymer particles according to claim 1, wherein the melt flow rate of the polymer particles is 0.5–30 g/10 minutes.

5. The propylene-base random copolymer particles according to claim 1 wherein said quenched copolymer particles have from about 10 to about 20 cells/mm$^2$.

* * * * *

UNITED STATES PATENT AND TRADEMARK OFFICE
CERTIFICATE OF CORRECTION

PATENT NO. : 4,692,507
DATED : September 8, 1987
INVENTOR(S) : Hiroyuki Akiyama, et al.

It is certified that error appears in the above-identified patent and that said Letters Patent is hereby corrected as shown below:

<u>In the Title</u>

Please delete the title in its entirety and add the following in lieu thereof "Foamable Ethylene-Propylene Random Copolymer Columnar Particles".

Signed and Sealed this

Second Day of February, 1988

*Attest:*

DONALD J. QUIGG

*Attesting Officer*  *Commissioner of Patents and Trademarks*